(No Model.)
H. H. BOWKER.
Unhitching Device for Stable Stalls.
No. 232,107. Patented Sept. 14, 1880.
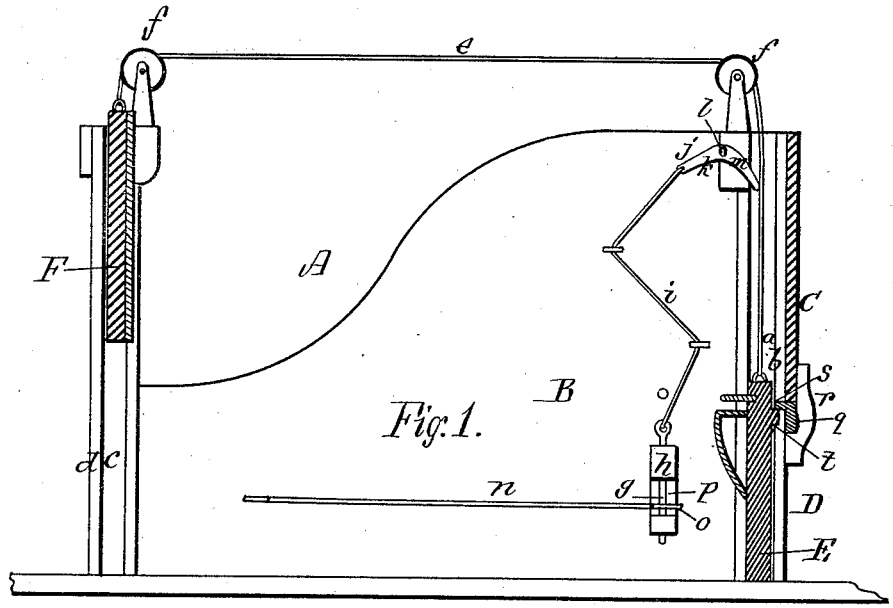
Fig. 1.
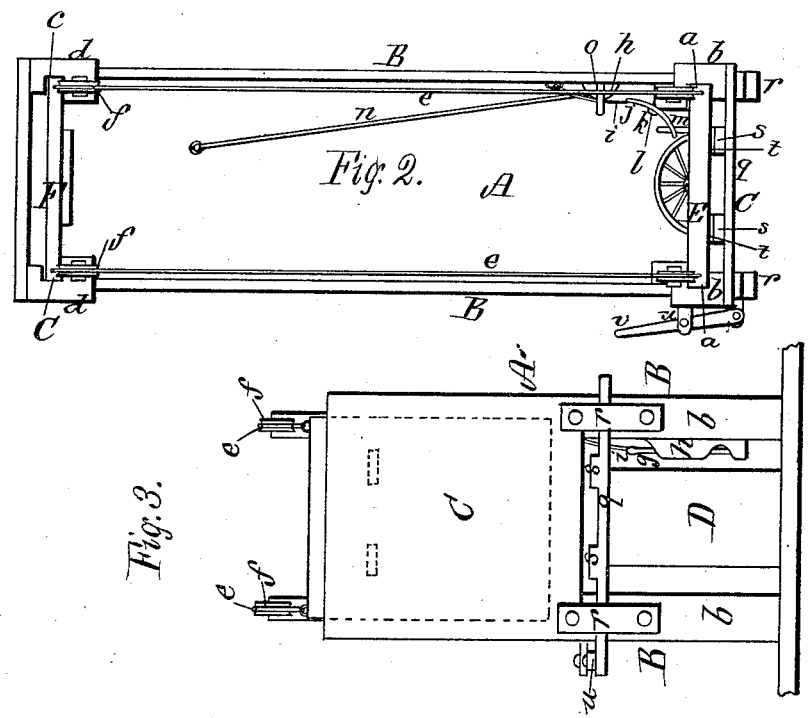
Fig. 2.
Fig. 3.
Witnesses.
F. G. Simpson.
Charles J. Brothers
Inventor.
Hannah H. Bowker.
by W. H. Babcock, Atty.

UNITED STATES PATENT OFFICE.

HANNAH H. BOWKER, OF BOSTON, MASSACHUSETTS.

UNHITCHING DEVICE FOR STABLE-STALLS.

SPECIFICATION forming part of Letters Patent No. 232,107, dated September 14, 1880.

Application filed June 17, 1880. (No model.)

*To all whom it may concern:*

Be it known that I, HANNAH H. BOWKER, a citizen of the United States, residing in Boston, in the county of Suffolk and State of Massachusetts, have invented certain Improvements in Unhitching Devices for Stable-Stalls; and I do hereby declare the following to be a full, clear, and exact description of the invention, such as will enable others skilled in the art to which it appertains to make and use the same.

This invention relates to means for instantly and readily removing horses from burning stables; and it consists, mainly, in the employment, in combination with each stall, of two vertically-sliding doors, one in front and one in rear of the animal, the rear door under ordinary circumstances being elevated and out of use, and the front door being lowered or closed to prevent escape of the animal at this end of the stall, the front doorway opening into the stable or directly into the air through the side of the stable, as may be preferred. The two doors of each stall are connected by chains or cords passing over pulleys in such manner that when the front door is raised to permit of escape of the animal in case of danger the rear door falls simultaneously and shuts off communication between the interior of the stable, which may be on fire, and the stall, and prevents the animal from getting access to the fire. The rear door is weighted to overbalance and lift the front, and the latter is held down by a slide-bar which engages it, the doors of the entire series of stalls being controlled by one bar, and the latter being operated from the outside of the stable or from the inside of the same, as may be preferred.

My invention further includes the combination, with said system of doors, of a hitch-bolt connected with and operated by a bell-crank lever pivoted to the front corner of the stall, and so as to be intercepted by the front door when the latter is raised, and actuate the latch to release the horse, as hereinafter described.

The drawings accompanying this specification represent, in Figure 1, a vertical section taken longitudinally of the stall; Fig. 2, a plan, and Fig. 3 a view of stall from the front.

In these drawings, A represents a single stall of a series of a stable designed for accommodating a number of horses, the sides of the stall being shown at B B, and the front of the stall, which in this case is supposed to be one side wall of the stable, at C. A doorway, D, is formed in the front of the stall, and preferably leading into the open air, each doorway being provided with a door, E, which slides in vertical grooves $a$ $a$ in posts $b$ $b$ contained in the corners of the stall.

The inner or rear end of the stall is provided with a door, F, which is weighted to overbalance the door E, and slides in vertical grooves $c$ $c$ formed in posts $d$ $d$, erected at the ends of the sides of the stall, and the upper corners of the two doors are united or connected by chains or ropes $e$ $e$, secured at their ends to the doors, and passing over pulleys $f f f f$, secured respectively to the tops of the posts $b$ $b$, $d$ $d$, the front door, in its usual or normal position, being lowered, and closing its doorway D to prevent passage of the animal thereat, while the rear door, under like circumstances, is elevated to allow the stall to be unobstructed at this end.

The latch-bolt for securing the horse while in the stall consists of an upright bolt, $g$, contained in a sheath, $h$, secured to one side of the stall at its front part, the upper end of this bolt being connected to the lower end of a chain or cord, $i$, the upper end of which, in turn, is connected to the lower vertical arm, $j$, of a bell-crank lever, $k$, which is pivoted, as shown at $b$, to the upper part of the adjacent post $b$ of the stall, the upper and horizontal arm, $m$, of said lever being so situated as to intercept the front door when the latter is raised, by which means the bolt $g$ is raised in its sheath $h$ to such an extent as to free the latch and release the horse.

The latch proper is a rod, $n$, having an eye, $o$, at one end to enter a notch, $p$, in the lower part of the sheath $h$ and be engaged by the bolt when the latter is in its lowest and usual position.

The opposite end of the hitch is adapted to be buckled or otherwise secured to the animal's halter.

In front of the front doorways of the series of stalls, and in the present instance upon the outside of the stable, I arrange a long horizontal slide-bar, q, which is supported in suitable guides r r, &c., in such manner as to be susceptible of endwise movements therein, and to the inner edge of this bar I add one or more lateral spurs or ears, s, which rest over and upon corresponding spurs t upon the upper edge of the front door, E, to hold the latter down against the preponderating weight of the rear door, which would tend to raise it.

By seizing one end of the bar q and sliding the latter a short distance the two series of spurs are disengaged, and the rear door, by its superior weight, falls and closes the rear end of the stall, and simultaneously therewith the front door is elevated and its doorway opened to permit of escape or removal of the horse thereat, while, as the front door reaches its highest position, it abuts against and raises the inner arm of the lever k, and in so doing raises the bolt g and releases the horse.

It is well known that the tendency of horses in the event of a stable taking fire is often to rush into the flames, and it is difficult and often impossible to rescue them. By closing the rear end of the stall, as stated, the horse is prevented from getting access to the flames, and in fact the door obscures the sight of the fire, so that the natural impulse of the horse will be to escape into the open air through the front doorway. Should he fail to do so, the rear door affords a certain protection to the hostler in entering the stall to lead out the animal.

The slide, in lieu of being operated from the outside of the stable, as stated, may be operated from within the latter, if desired, and to enable this to be readily done I employ at one or more points a horizontal lever, u, pivoted to the front outer part of the side of the stall on the inside wall of the stable, and at its front end pivoted to the slide-bar. By means of the handle v of this lever the slide-bar may be operated from the interior of the stable.

In lieu of a slide-bar or other device adapted to hold down the front door against the preponderating weight of the rear door, as stated, such bar may be adapted to uphold the said rear door, and operating, when withdrawn, to leave such door free to drop by its own gravity. I prefer, however, the arrangement first described.

Having thus explained the nature, purpose, and operation of my invention, I claim and desire to secure by Letters Patent of the United States as follows:

1. A stall for horses or other animals, having in addition to its side walls a vertically-sliding door in front and rear connected together, and adapted to operate automatically in such manner that upon operating the releasing mechanism the front door rises and exposes an open doorway in front of the animal, while simultaneously therewith the door in rear of the animal drops to prevent passage at that end of the stall, substantially as described.

2. In a series of stable-stalls having front and rear doors operating automatically and simultaneously in opposite directions in vertical planes, as explained, a slide-bar adapted to hold one door in its lowest position against the overbalancing weight of the other, substantially as and for purposes stated.

3. The combination, with the slide-bar and operating-door, of a lever pivoted to the inside of the stable and operating the slide-bar from the interior of said stable, substantially as and for the purposes set forth.

4. In combination with the two vertically-sliding doors adapted to move simultaneously and in opposite directions, a hitching-bolt adapted to be released by the movements of the door, substantially as described.

5. The hitching device herein explained, consisting of the bolt contained in a suitable sheath and adapted to be connected with the animal's halter, and connected at one end to one arm of a bell-crank lever pivoted at the upper front part of the stall above the adjacent door, and with its free arm arranged to intercept and be actuated by such door in a manner to raise the bolt and release the animal when on occasions of danger the front door of the stall is raised, substantially as and for the purposes set forth and described.

In testimony whereof I affix my signature in presence of two witnesses.

HANNAH H. BOWKER.

Witnesses:
DANIEL BOWKER,
FREDERICK CURTIS.